United States Patent
Ramunni et al.

(10) Patent No.: US 11,365,136 B2
(45) Date of Patent: Jun. 21, 2022

(54) ELECTRODE FOR ELECTROCHLORINATION PROCESSES

(71) Applicant: INDUSTRIE DE NORA S.P.A., Milan (IT)

(72) Inventors: Anna Ramunni, Milan (IT); Fabio Timpano, Milan (IT)

(73) Assignee: INDUSTRIE DE NORA S.P.A., Milan (IT)

(*) Notice: Subject to any disclaimer, the term of this patent is extended or adjusted under 35 U.S.C. 154(b) by 240 days.

(21) Appl. No.: 16/567,712

(22) Filed: Sep. 11, 2019

(65) Prior Publication Data

US 2020/0024161 A1 Jan. 23, 2020

Related U.S. Application Data

(63) Continuation-in-part of application No. PCT/EP2019/056347, filed on Mar. 13, 2019.

(30) Foreign Application Priority Data

Mar. 14, 2018 (IT) .......................... 102018000003533

(51) Int. Cl.
| | | |
|---|---|---|
| *C25B 1/26* | (2006.01) | |
| *C25B 11/093* | (2021.01) | |
| *C02F 103/42* | (2006.01) | |
| *C02F 1/461* | (2006.01) | |
| *C02F 1/467* | (2006.01) | |

(52) U.S. Cl.
CPC ........ *C02F 1/46109* (2013.01); *C02F 1/4674* (2013.01); *C25B 1/26* (2013.01); *C25B 11/093* (2021.01); *C02F 2001/46142* (2013.01); *C02F 2103/42* (2013.01); *C02F 2201/4613* (2013.01)

(58) Field of Classification Search
CPC ......... C02F 2001/46142; C25B 11/093; C25B 11/097; C25B 11/063; C25B 11/071; C25B 11/052; C25B 11/051; C25B 11/054
See application file for complete search history.

(56) References Cited

U.S. PATENT DOCUMENTS

| | | | | | |
|---|---|---|---|---|---|
| 3,948,751 A | * | 4/1976 | Bianchi | .................... | C25B 11/04 204/290.03 |
| 4,003,817 A | * | 1/1977 | Bianchi | .................... | C25B 11/04 204/290.03 |
| 4,070,504 A | * | 1/1978 | Bianchi | ..................... | C25B 1/46 427/126.3 |
| 4,072,585 A | * | 2/1978 | Bianchi | ..................... | C25B 1/46 205/535 |

\* cited by examiner

*Primary Examiner* — Salil Jain
(74) *Attorney, Agent, or Firm* — D'Ambrosio & Menon, PLLC; Usha Menon

(57) ABSTRACT

The present invention relates to an electrode for electrochlorination processes, optionally operable under polarity reversal conditions, comprising an active layer provided with a doped Ru—Ti catalytic composition.

10 Claims, No Drawings

ELECTRODE FOR ELECTROCHLORINATION PROCESSES

CROSS-REFERENCE TO RELATED APPLICATION

This application is a bypass continuation-in-part of International Application No.: PCT/EP2019/056347 filed on Mar. 13, 2019, which claims the benefit of Italian Patent Application No.: IT 102018000003533, filed Mar. 14, 2018, the entire contents of which are incorporated by reference in their entirety.

FIELD OF THE INVENTION

Electrode for electrochlorination processes optionally operable under polarity reversal conditions and method for producing the same.

BACKGROUND OF THE INVENTION

Electrochlorination processes consist in the production of hypochlorite from salt water via an electrolytic reaction. The resulting sodium hypochlorite may be exploited in a variety of applications concerning water disinfection and oxidation, such as water treatment for drinking water or swimming pools.

Sodium hypochlorite is effective against bacteria, viruses and fungi and has the advantage that microorganisms cannot develop resistance to its effects.

Contrary to chlorine gas or tablets, which may be added to water in order to achieve similar results, in electrochlorination processes the active chemical is produced on site, thus avoiding transportation, environmental and/or storage issues. The process is carried out by applying a suitable current to an electrolytic cell comprising at least two electrodes and an electrolyte containing salt and water. The result of the electrochemical reaction is the production of sodium hypochlorite and hydrogen gas.

Titanium anodes provided with Ru—Ti active coating compositions have been used in the past in these type of cells. These coating compositions may optionally comprise Pd in order to increase the free available chlorine production efficiency.

However, in order to ensure high efficiency under a variety of operation conditions, increase electrode stability and reduce electrode costs, alternative electrodes to the ones known in the art, with comparable or higher efficiency, are desirable.

Furthermore, in order to prevent/reduce the formation of scales on the electrodes, which negatively impact on the hypochlorite production efficiency of the cell, a periodic polarity inversion may be applied to the electrodes so as to promote their self-cleaning. Reversing the polarity also reduces ion bridging between the electrodes and may prevent uneven electrode wear.

However, some elements occasionally used in the active coating composition, such as palladium, are not stable under polarity reversal and dissolve in the electrolyte after few inversion cycles, thereby leading to inadequate electrode lifetimes.

Furthermore, the swimming pool industry has been successfully introducing into the market pools operating at lower salt levels, such as for example 1 g/l of NaCl instead of the conventional value of 2.5-4 g/l, in order to minimize corrosion issues of salt pools. Traditional Ru—Ti coatings at this lower salt level pay penalties in terms of efficiency. This deficiency cannot be remedied by the addition of Pd in case of polarity reversal applications because of its instability under such operating conditions. Additionally, Pd is an expensive noble metal that increases the overall upfront costs of an electrochlorination system if used in substantial quantities within the electrode coating.

It is therefore desirable to have electrodes for electrochlorination processes exhibiting improved efficiency and lifetimes under a wide spectrum of possible applications and operative conditions, optionally including polarity reversal conditions, and possibly maintaining reduced production costs.

It is furthermore desirable to have electrodes for electrochlorination processes, optionally self-cleaning, for use in low salinity applications, such as for example low-salt pools (operating at 0.5-2.5 g/l NaCl) or for functional water generation (operating at few ppm of Cl—).

SUMMARY OF THE INVENTION

The present invention relates to an electrode suitable for electrochlorination processes comprising a valve metal substrate and at least one active layer comprising a Ru—Ti catalytic composition doped with at least a first doping agent Y1, where Y1 comprises copper or oxides thereof and optionally an element selected from the group consisting of rhodium, platinum, iridium, their oxides, and/or their combinations, as described and claimed hereinafter.

The catalytic composition may optionally further comprise palladium or its oxides.

Under another aspect, the present invention relates to a method for manufacturing the electrode according to the invention.

Under another aspect, the present invention relates to a process for hypochlorite mediated water disinfection employing the electrode according to the invention. Under another aspect, the present invention relates to the use of the electrode according to the invention in swimming pools, in particular low-salinity pools, or for functional water generation.

DETAILED DESCRIPTION OF THE INVENTION

Under one aspect, the present invention relates to an electrode suitable for electrochlorination processes comprising a valve metal substrate and at least one active layer comprising a catalytic composition of ruthenium, titanium and at least a first doping agent Y1, where Y1 comprises copper or oxides thereof.

The catalytic composition of the electrode according to the invention contains an amount of ruthenium between 20-50%; the amount of Y1 being 0.2-3.2%, or 0.4-2.4%, or 0.6-1.7%.

The catalytic composition of the electrode according to the invention contains an amount of titanium equal or less than 79.8%, depending on the presence or absence of additional elements, such as further doping elements, which are added at the expense of the titanium content.

All amounts are expressed in weight percentage referred to the elements.

The titanium content in the catalytic composition may typically be above 40%, preferably above 55%, above 65% as it may positively impact on the electrode durability.

Besides the claimed active layer, additional layers (such as protective layers above or below the active layer) may be introduced without departing from the scope of the invention.

The inventors have observed that the addition of a first doping agent Y1 to the Ru—Ti active composition allows to reach excellent electrode lifetimes, particularly in case the electrode is subject to polarity inversion, provided Y1 comprises copper or its oxides.

Under a further embodiment, Y1 further comprises rhodium, platinum, iridium, or their oxides, or combinations thereof. The inventors have observed that the combination of copper with rhodium, platinum, iridium, may further benefit the electrode lifetime.

The doping agent Y1 may therefore comprise or consist of Cu, Cu—Rh, Cu—Ir, Cu—Pt, Cu—Rh—Ir, Cu—Pt—Ir, Cu—Rh—Pt, Cu—Rh—Ir—Pt, where the compositions may include the oxides of the elements.

Particularly, Y1 may advantageously consist of Cu, or of the combinations of Cu—Rh, Cu—Ir, or Cu—Rh—Ir, including oxides thereof.

The electrodes composed with disclosed amounts of the first doping agent Y1 according to any of the embodiments hereinbefore described exhibit very good stability under current reversal without paying any penalties in terms of efficiency. Therefore, these electrodes may be advantageously used in a variety of electrochlorination processes, regardless of whether they involve polarity inversion or not. Examples of applications include functional water generation and swimming pools, particularly low salinity pools.

Under one embodiment, the electrode according to the invention comprises a valve metal substrate and at least one active layer, this active layer consisting of a catalytic composition of ruthenium, titanium and at least a first doping agent Y1, wherein ruthenium is 20-50%, titanium is 46.8-79.8% and Y1 is between 0.2-3.2% expressed in weight percentage referred to the elements.

Under a further embodiment the catalytic composition of the electrode of the present invention further comprises a second doping agent containing palladium or its oxides in an amount of 0.2-2.2%, preferably 0.3-2%, even more preferably 0.5-1.4%.

The inventors observed that the compositions above, with the addition of palladium, exhibit increased efficiency. It has been observed that palladium, in the small amounts indicated hereinbefore, does not adversely impact on the duration of the electrode when in combination with Y1, even under polarity inversion, in particular when Y1 comprises both copper and rhodium.

Therefore, there seems to be a synergic effect that allows the different technical effects of the doping agents Y1 and Pd, taken alone, not to be cancelled out when combined together.

Under a further aspect, the present invention relates to a method for manufacturing an electrode according to any one of the embodiments hereinbefore described comprising: (i) applying a catalytic solution containing precursors of ruthenium, titanium and of the doping agent Y1 to a valve metal substrate, (ii) subsequently performing a thermal decomposition step by executing a thermal treatment in air at a temperature between 450-500° C.

The catalytic solution may additionally contain precursors of palladium.

Optionally, the valve metal substrate is etched before application of the catalytic solution prior to the thermal decomposition step.

The coated valve metal substrate may be air dried before the thermal decomposition step.

The active layer can be formed by executing the above manufacturing method once (i.e. with just one hand of coating), with or without the optional steps described.

Alternatively, the above method may be repeated several times for each hand of catalytic coating, with or without the optional steps described, until the desired Ru loading is achieved.

Under a further aspect, the present invention is directed to a process for hypochlorite mediated water disinfection comprising the steps of: (i) flowing an aqueous solution containing NaCl between two opposite electrodes, where at least one is the electrode according to the invention as hereinbefore described, (ii) applying an external voltage between said two opposite electrodes thereby producing hypochlorite in said aqueous solution.

Under a further aspect, the present invention is directed to a low salinity pool implementing the process for hypochlorite mediated water disinfection described above.

The following examples are included to demonstrate particular ways of reducing the invention to practice, whose practicability has been largely verified in the claimed range of values.

It should be appreciated by those of skill in the art that the equipment, compositions and techniques disclosed in the following represent equipment, compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

Experiment Preparation

In all the electrode samples used in the following EXAMPLE, COUNTEREXAMPLE and COMPARATIVE EXAMPLES, the electrode substrate was manufactured starting from a titanium grade 1 plate of 100 mm×100 mm×1 mm size, degreased with acetone in an ultrasonic bath for 10 minutes. The plate was then subjected to grit blasting to obtain a surface roughness value Rz above 25 μm, and was subsequently annealed for 6 hours at 650 ° C. Finally, the plate was etched in a solution containing 22% by weight of HCl at boiling temperature for 30 minutes, resulting in a total weight loss of 200 g/m$^2$.

EXAMPLE 1

The catalytic solution Se1 used for the preparation of sample E1 listed in TABLE 1 was obtained by dissolving chloride salts of ruthenium, titanium, and of the doping agent Y1 in aqueous HCl at 10%, with a final concentration of ruthenium in each catalytic solution equal to 40 g/l. The solution Se1 contained the precursors of the elements listed in TABLE 1 (under "Composition"), in accordance with the corresponding weight percentages referred to the elements (provided under "Weight composition").

The solutions thus prepared were stirred for 30 minutes.

Sample E1 was obtained by coating the titanium substrates described above with solutions Se1 respectively, the solution was applied by brush with a gain rate of 0.8 g/m$^2$ of ruthenium.

After each coating application the sample was air-dried at 60° C. for 10 minutes and subsequently baked at a temperature between 450° C.-500° C. for up to 15 minutes.

The coating procedure above was repeated until achieving a loading of Ru equal to 20 g/m$^2$. The sample underwent a post-bake treatment for 3 hours at a temperature between 500° C. -550° C. The resulting electrode sample E1 according to the invention was then tested and characterised according to the procedure set out in COMPARATIVE EXAMPLE 1 and 2.

TABLE 1

| Catalytic Solution | Composition | Weight composition (w %) | | | Electrode Sample |
| --- | --- | --- | --- | --- | --- |
| | | Ru | Ti | Y1 | |
| Se1 | RuTiCu | 30 | 69 | 1 | E1 |

COUNTEREXAMPLE 1

The sample C1 listed in TABLE 2 and the corresponding catalytic solution Sc1 used for its preparation was obtained according to the same procedure described in EXAMPLE 1, where the solution Sc1 contained the precursors of the elements listed in TABLE 2 according to the respective weight percentages indicated therein.

TABLE 2

| Catalytic Solution | Composition | Weight composition (w %) | | | Electrode Sample |
| --- | --- | --- | --- | --- | --- |
| | | Ru | Ti | Y1 | |
| Sc1 | RuTi | 25 | 75 | — | C1 |

COMPARATIVE EXAMPLE 1

Electrode sample E1 according to EXAMPLE 1 and electrode sample C1 according to COUNTEREXAMPLE 1 were conditioned overnight to stabilize their performance: both electrodes E1, C1 were used as anodes in a beaker containing an aqueous solution of NaCl at 29 g/l, with a counter-electrode (a titanium plate cathode) placed at an interelectrodic distance of 2 mm, and each anode-cathode pair was operated at a current density of 1 kA/m$^2$.

The efficiency of the electrode pairs above was then tested in a beaker containing 1 l of an aqueous solution of 1 g/l of NaCl. The solution was at a temperature of 25° C.±2 ° C. and the electrodes operated at a current density of 300 A/m$^2$ for 45 minutes.

At the end of the experiment the hypochlorite concentration generated in the aqueous solution was determined by iodometric titration.

The efficiency of the electrode was determined as the ratio between the actual conclentration of NaOCl versus the theoretical concentration, calculated according to Faraday law of electrolysis, expressed in percentage.

The results of the efficiency test for electrodes E1, C1 are listed in TABLE 3.

COMPARATIVE EXAMPLE 2

Two sets of electrodes E1 and two sets of electrodes C1 were prepared according to EXAMPLE 1 and COUNTEREXAMPLE 1 respectively.

Each electrode couple E1-E1, C1-C1, featured an interelectrodic gap of 3 mm and was inserted in a dedicated beaker containing 1 l of an aqueous solution containing 4 g/l of NaCl and 70 g/l of Na$_2$SO$_4$.

All electrode couples were operated at a current density of 1000 A/m$^2$ and were subject to polarity inversion every 1 minute during the test duration. Each electrode couple was kept in testing conditions until cell voltage exceeded 8.5 volt (the "Accelerated Lifetime", measured in hours for each g/m$^2$ of ruthenium in the catalytic composition).

TABLE 3

| Sample Electrode | Efficiency (%) | Accelerated Lifetime (hours per g/m$^2$ of Ru) |
| --- | --- | --- |
| C1 | 40% | 9.5 |
| E1 | 50% | 9.7 |

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. An electrode suitable for electrochlorination processes comprising:
    a valve metal substrate; and
    at least one active layer comprising:
        a catalytic composition of ruthenium, titanium; and
        at least a first doping agent Y1,
    wherein ruthenium is between 20-50%, titanium is equal or below 79.8% and Y1 is between 0.2-3.2% expressed in weight percentage referred to the ruthenium and titanium;
    Y1 comprising copper or its oxides, and wherein Y1 further comprises rhodium, platinum, iridium, their oxides, or any combination thereof.

2. The electrode according to claim 1 wherein the amount of Y1 is between 0.6-1.7%.

3. The electrode according to claim 1 wherein the amount of Y1 is between 0.6-1.7%.

4. The electrode according to claim 1 wherein the catalytic composition further comprises an optional second doping agent containing 0.2-2.2% of palladium or its oxides.

5. The electrode according to claim 1 wherein the catalytic composition further comprises 0.2-2.2% of palladium or its oxides.

6. The electrode according to claim 1 wherein the amount of Y1 is 0.6-1.7% and palladium is 0.5-1.4%.

7. The electrode according to claim 1 wherein Y1 consists of copper, copper and rhodium, copper and iridium, or the combination of rhodium, copper and iridium, or oxides thereof.

8. The electrode according to claim 7 wherein the amount of Y1 is between 0.6-1.7%.

9. The electrode according to claim 7 wherein the catalytic composition further comprises 0.2-2.2% of palladium or its oxides.

10. The electrode according to claim 8 wherein the catalytic composition further comprises 0.5-1.4% of palladium or its oxides.

* * * * *